US008593487B2

(12) United States Patent
Sabanai et al.

(10) Patent No.: US 8,593,487 B2
(45) Date of Patent: Nov. 26, 2013

(54) DRAWING SUPPORT DEVICE, DRAWING SUPPORT PROGRAM, AND DRAWING SUPPORT METHOD

(75) Inventors: Shunji Sabanai, Wako (JP); Kenji Shimada, Pittsburgh, PA (US)

(73) Assignees: Honda Motor Co., Ltd., Tokyo (JP); Carnegie Mellon University, Pittsburgh, PA (US)

( * ) Notice: Subject to any disclaimer, the term of this patent is extended or adjusted under 35 U.S.C. 154(b) by 704 days.

(21) Appl. No.: 12/269,538

(22) Filed: Nov. 12, 2008

(65) Prior Publication Data

US 2010/0116963 A1 May 13, 2010

(51) Int. Cl.
*G09G 5/00* (2006.01)
*G06F 17/00* (2006.01)

(52) U.S. Cl.
USPC .......................................... 345/642; 345/418

(58) Field of Classification Search
USPC .......... 345/1.1–111, 581–618, 156–184, 642, 345/441–443, 462
See application file for complete search history.

(56) References Cited

U.S. PATENT DOCUMENTS

| 5,513,309 A * | 4/1996 | Meier et al. ................... 715/860 |
| 6,396,481 B1 * | 5/2002 | Challa et al. ................... 345/169 |
| 6,785,418 B1 * | 8/2004 | Barton et al. .................. 382/186 |
| 2006/0250393 A1 * | 11/2006 | Tsang et al. ................... 345/420 |

FOREIGN PATENT DOCUMENTS

| JP | 04-322375 | 11/1992 |
| JP | 07-105241 | 4/1995 |
| JP | 08-194840 | 7/1996 |
| JP | 10-269260 | 10/1998 |
| JP | 2000-235588 | 8/2000 |
| WO | WO 2007091436 A1 * | 8/2007 |

OTHER PUBLICATIONS

Igarashi et al. "Interactive Beautification: A Technique for Rapid Geometric Design", Proceeding SIGGRAPH'07 ACM SIGGRAPH 2007 courses, ACM New York, NY 2007, p. 1-10.*
Takeo Igarashi et al., "A Suggestive Interface for 3D Drawing. Workshop on Interactive System and Software IX" (Japan Society for Software Science and Technology, WISS 2001).
Takeo Igarashi et al., "Interactive Beautification: A Technique for Rapid Geometric Design.: Transactions of Information Processing Society of Japan", pp. 1-12.

* cited by examiner

*Primary Examiner* — Tize Ma
*Assistant Examiner* — Yingchun He
(74) *Attorney, Agent, or Firm* — Arent Fox LLP (57) ABSTRACT

The present invention provides a device capable of supporting drawing work while improving the continuity of the drawing work. According to a drawing support device, components corresponding to successive position trajectories of the tip of a pen are displayed on a panel, and this enables drawing work with the feeling of hand drawing. Further, among the components displayed on the panel, the shape or the like of a "first component" to be a changing target is changed based on the shape or the like of a "reference component" selected from "second components" excluded from the selection of the changing target, so that the workload of adjustment of the shape or the like of the first component can be reduced.

9 Claims, 7 Drawing Sheets

DRAWING SUPPORT DEVICE, DRAWING SUPPORT PROGRAM, AND DRAWING SUPPORT METHOD

BACKGROUND OF THE INVENTION

1. Field of the Invention

The present invention relates to a device and the like for supporting user's drawing work.

2. Description of the Related Art

An object-based drawing editor such as a CAD system involves extra work to call an editing command for copy, flip, or the like, or a drawing mode such as for drawing a vertical component for a specified component, which is not involved in hand drawing. Therefore, a drawing method with component specification and candidate presentation is proposed as an interaction technique for rapid and accurate drawing without the need to call editing commands or drawing modes (see Non-Patent Document 1). According to this drawing technique, a 3D scene is created only by highlighting of drawings and components on a diagram. A drawing technique with beautification is also proposed as a similar interaction technique (see Non-Patent Document 2). According to this drawing technique, geometric constraints are inferred based on the outline of a component directly input with a pen or mouse, and plural candidates are presented as this inference result.

[Non-Patent Document 1] Takeo Igarashi and John. F. Hughes. A Suggestive Interface for 3D Drawing. Workshop on Interactive System and Software IX (Japan Society for Software Science and Technology, WISS 2001).

[Non-Patent Document 2] Takeo Igarashi, Satoshi Matsuoka, Sachiko Kawachiya, and Hidehiko Tanaka. "Interactive Beautification: A Technique for Rapid Geometric Design." Transactions of Information Processing Society of Japan. Vol. 39. No. 5. pp. 1373-1384. May, 1998.

However, according to the drawing method with component specification and candidate presentation, component specification operations such as highlighting of a component or a group of connected components is required, and this impairs the feeling of continuous drawing like hand drawing. Further, according to the drawing method with interactive beautification, the number of candidates to be presented becomes too large in the progress of drawing work. This makes candidate selection work burdensome, and hence impairs the feeling of continuous drawing like hand drawing as well.

Therefore, it is an object of the present invention to provide a device and the like capable of supporting drawing work while improving the continuity of drawing work.

SUMMARY OF THE INVENTION

In one aspect of the present invention, a drawing support device includes a drawing tool, a drawing medium, and an output control device which causes the drawing medium to display components corresponding to position trajectories of the drawing tool, wherein the output control device recognizes the components displayed on the drawing medium by classifying the components into a first component as a changing target, whose shape, posture, or arrangement, or a combination thereof (hereinafter referred to as "shape or the like") is to be changed, and a second component excluded from the changing target; specifies the second component as a reference component on condition that the second component has a specified position in relation to the first component which changes the shape or the like of the first component based on the shape or the like of the reference component, and recognizes, as the second component, the first component targeted for a freezing operation using the drawing.

According to the drawing support device of the first aspect of the present invention, components corresponding to position trajectories (indicative of changes in position over time) of the drawing tool are displayed on the drawing medium, and this enables drawing work using the drawing tool with the feeling of hand drawing. Further, among the components displayed on the drawing medium, the shape or the like of the "first component" as the changing target is changed based on the shape or the like of the "reference component" selected from "second components" excluded from the selection of the changing target, so that the workload of adjustment of the shape or the like of the first component can be reduced. Further, although the first component targeted for the freezing operation is recognized as a second component, since the drawing tool is used for the freezing operation, the changed shape or the like of the first component can be stored without impairing continuity from the hand drawing of the components to the drawing work. Further, since the reference component is limited to a second component that has a specified position in relation to the first component, a situation can be avoided in which a large number of first components whose shapes or the like have been changed in different aspects are displayed on the drawing medium which would make the freezing operation more complicated. Thus, the drawing work using the drawing tool can be supported while improving the continuity of the drawing work.

In a second aspect of the present invention, a drawing support device is based on the drawing support device of the first aspect of the present invention, wherein the output control device specifies the second component as the reference component on condition that the second component has been targeted for a specification operation using the drawing tool in addition to or instead of the requirement that the second component has the specified position in relation to the first component.

According to the drawing support device of the second aspect of the present invention, although the second component targeted for the specification operation is specified as the reference component, since the drawing tool is used for the specification operation, the reference component after the first component is changed can be specified without impairing continuity from the hand drawing of the components to the drawing work. Further, since the reference component is limited to a second component that has the specified position relation with the first component, a situation can be avoided in which a large number of first components whose shapes or the like have been changed in different aspects are displayed on the drawing medium which would make the freezing operation more complicated. Further, since the shape or the like of the first component is changed based on the shape or the like of the reference component at any time in response to the specification operation, the workload of adjustment of the shape or the like of the first component can be reduced. Thus, the drawing work using the drawing tool can be supported while improving the continuity of the drawing work.

In a third aspect of the present invention, a drawing support device is based on the drawing support device of the first aspect of the present invention, wherein the output control device recognizes, as the first component, the second component targeted for an unfreezing operation using the drawing tool.

According to the drawing support device of the third aspect of the present invention, since the second component targeted for the unfreezing operation is recognized as the first component, the shape or the like of any second component can be changed at any time in response to the unfreezing operation. Therefore, the workload of adjustment of the shape or the like of the second component recognized as the first component can be reduced. Further, since the drawing tool is used for the unfreezing operation, the shape or the like of any second component displayed on the drawing medium can be changed without impairing continuity from the hand drawing of the components to the drawing work. Thus, the drawing work using the drawing tool can be supported while improving the continuity of the drawing work.

In a fourth aspect of the present invention, a drawing support device is based on the drawing support device of the first aspect of the present invention, wherein the output control device recognizes a memo represented by position trajectories of the drawing tool to cause the drawing medium to display the memo.

According to the drawing support device of the fourth aspect of the present invention, a memo related to a component can be displayed on the drawing medium. This makes it easy to find the way to arrange components by confirmation of design intent based on the content of the memo, or to make a decision such as to determine the need to add or erase a component, so that the drawing work can be supported while improving the continuity thereof.

In a fifth aspect of the present invention, a drawing support device is based on the drawing support device of the first aspect of the present invention, wherein the output control device erases a component from the drawing medium in the case that the component meets such requirement that a position trajectory of the drawing tool corresponds to an erasing gesture and the position trajectory overlaps the component displayed on the drawing medium.

According to the drawing support device of the fifth aspect of the present invention, since an existing component can be erased by an operation using the drawing tool with the feeling of hand drawing, the drawing work can be supported while improving the continuity thereof.

In a sixth aspect of the present invention, a drawing support program causes a computer to function as the drawing support device of the first aspect of the present invention, the computer including a drawing tool, a drawing medium, and an output control device which causes the drawing medium to display components corresponding to position trajectories of the drawing tool.

According to the drawing support program of the sixth aspect of the present invention, the computer including the drawing tool and the like can function as a device capable of supporting user's drawing work using the drawing tool while improving the continuity of the drawing work.

In the seventh aspect of the present invention, a drawing support method is a method of supporting user's drawing operations by means of a drawing support device including a drawing tool, a drawing medium, and an output control device, the method including the steps of: allowing the user to move the drawing tool; allowing the output control device to recognize position trajectories of the drawing tool moved by the user to cause the drawing medium to display components corresponding to the position trajectories; allowing the output control device to recognize the components displayed on the drawing medium by classifying the components into a first component as a changing target, whose shape, posture, or arrangement, or a combination thereof (hereinafter referred to as "shape or the like") is to be changed, and a second component excluded from the selection of the changing target; allowing the output control device to specify the second component as a reference component on condition that the second component has a specified position in relation to the first component; allowing the output control device to change the shape or the like of the first component based on the shape or the like of the reference component; allowing the user to perform a freezing operation on the first component using the drawing tool; and allowing the output control device to recognize, as the second component, the first component targeted for the user's freezing operation.

According to the drawing support method of the seventh aspect of the present invention, user's drawing work using the drawing tool can be supported while improving the continuity thereof.

BRIEF DESCRIPTION OF THE DRAWINGS

FIG. 4 (a)-(d) contain schematic diagrams for explaining the function of the drawing support device of the present invention in the drawing mode.

FIG. 5 (a)-(b) contain schematic diagrams for explaining the function of the drawing support device of the present invention in the drawing mode.

FIG. 6 (a)-(b) contain schematic diagrams for explaining the function of the drawing support device of the present invention in an editing mode.

DESCRIPTION OF THE PREFERRED EMBODIMENTS

A drawing support device according to a preferred embodiment of the present invention will now be described with reference to accompanying drawings.

Figure 1:
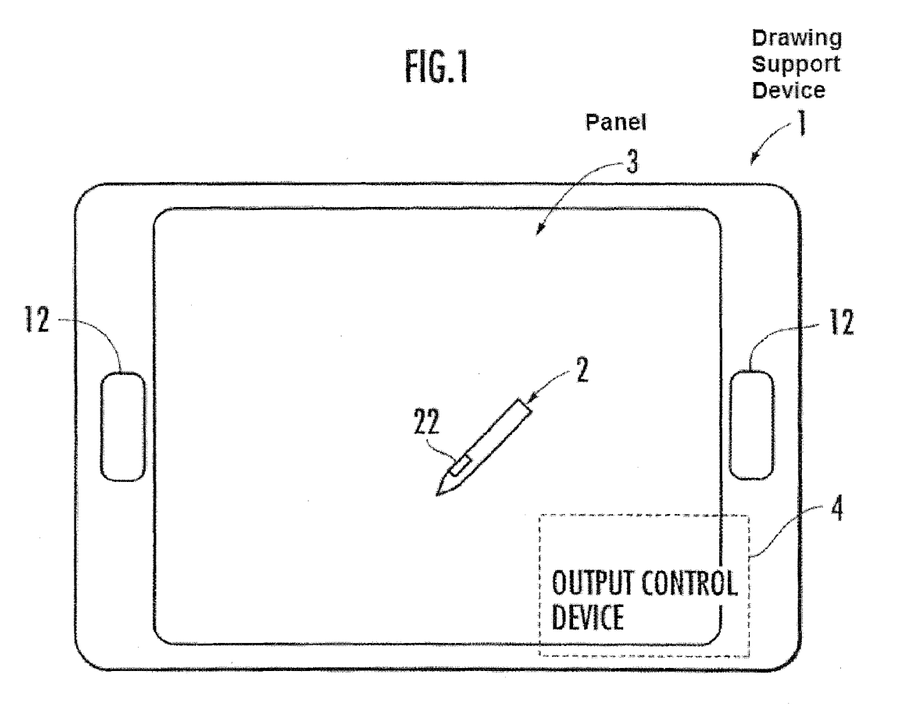
FIG. 1 is a schematic diagram showing the structure of a drawing support device according to the present invention.

First, the structure of the drawing support device will be described. A drawing support device 1 shown in FIG. 1 includes a pen (drawing tool) 2, an LD touch panel (drawing medium) 3, and an output control device 4. Instead of the pen 2, the drawing tool may be a pointing device such as a mouse. The pen 2 is equipped with an operation switch 22 for switching of reference components to be described later. The panel 3 displays line drawings or graphics consisting of components, and has a function for sensing the position of the tip of the pen 2 (pen nib) that is touching the panel 3. Note that the position of the tip of the pen 2 may be sensed by a touch-type drawing medium different from a drawing medium for display. The drawing support device 1 may also include a mode change switch 12 which in one embodiment could be arranged on both right-and-left sides of the panel 3 provided on the device body to allow a user to change modes among "drawing mode," "memo mode," and "editing mode." Alternatively, the mode change switch 12 may be omitted. In this case, the output control device 4 could be configured to determine the drawing mode, the memo mode, and the editing mode based on the shape of a position trajectory of the tip of the pen 2. The output control device 4 is constructed by a computer (consisting of a CPU, a ROM, a RAM, an I/O circuit, an A/D circuit, etc.) incorporated in the device body. The CPU of the output control device 4 reads a drawing support program of the present invention from a memory or storage device of the output control device 4, and performs various arithmetic processing to be described later according to the program. The output control device 4 recognizes position trajectories of the tip of the pen 2 that is touching the panel 3 based on the output of a touch-sensing circuit or sensor (not shown) to cause the panel 3 to display components such as line drawings according to the position trajectories. The output control device 4 recognizes the components displayed on the panel 3 by classifying them into a first component and a second component(s). The first component is a target component to be changed in terms of the shape or the like. The second component is a component excluded from the selection of the target component to be changed in terms of the shape or the like. The output control device 4 specifies the second component as a reference component on the condition that the second component has a specified positional relation with the first component to change the shape or the like of the first component based on the shape or the like of this reference component. The output control device 4 recognizes, as a second component, the first component targeted for a freezing operation using the pen 2.

Note that "recognize" means that the central processing unit (CPU) performs all arithmetic processing in preparation for other arithmetic processing using information or the like, including reading of the information or data as a recognition target from a storage device or database, performing certain arithmetic processing on the information or the like to make measurements, settings, calculations, estimations, etc., and saving or storing the information and the like in the storage device (or a memory).

The following describes the functions of the drawing support device 1 constructed such above. First, the function of the drawing support device 1 in the "drawing mode" will be described. According to the drawing mode, various lines, line segments, or graphics are drawn for car design drawings and the like. A successive position trajectory of the tip of the pen 2 that is touching the panel 3 is sensed, and a component corresponding to this position trajectory is recognized or sensed as the "first component" (S002 in FIG. 2). For example, as shown in FIG. 3, a first component $L_1$ corresponding to the position trajectory is displayed below an existing second component $L_2$ on the panel 3.

Figure 2:
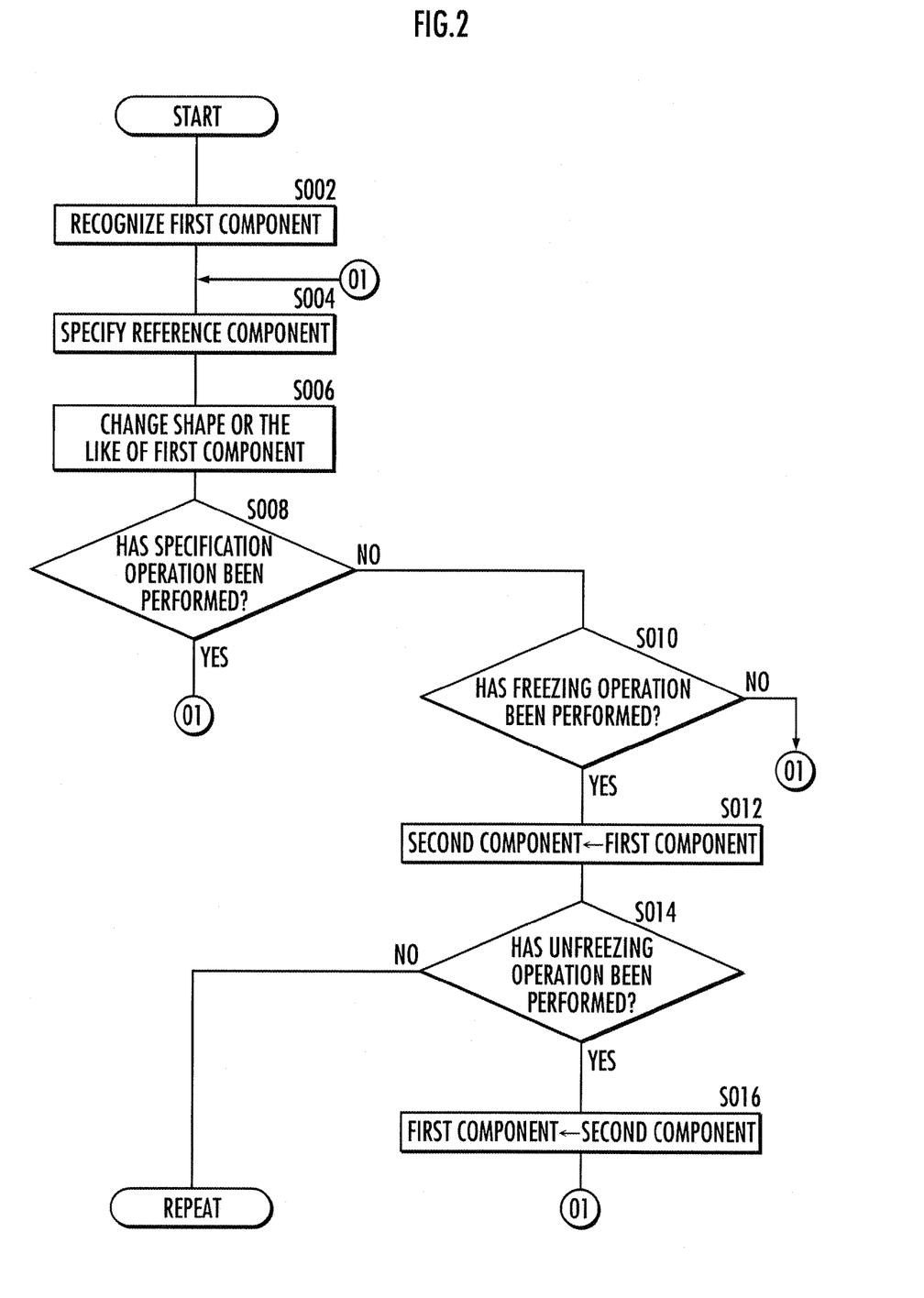
FIG. 2 is a flowchart showing the function of the drawing support device of the present invention in a drawing mode.
Figure 3:
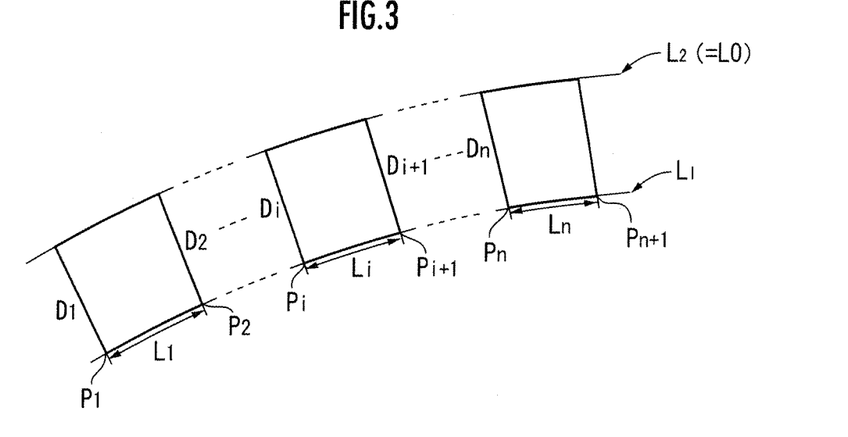
FIG. 3 is a schematic diagram for explaining the function of the drawing support device of the present invention in the drawing mode.

Then, among second components, a second component that meets such a requirement that it has the specified positional relation with the first component is specified as the reference component (S004 in FIG. 2). Suppose here that the "specified position relation" is set to denote that the degree of parallelization to the first component is equal to or more than a threshold value. In this case, as shown in FIG. 3, the second component $L_2$ is specified as a reference component $L_0$ because it meets conditional equations (1) and (2), which are expressed by the average value, $A(=\Sigma_i D_i/n)$, of the distances $D_i$ between the first component $L_1$ and the second component $L_2$ at each of sampling points $p_i$ (i=1, 2, ..., n) of the first component $L_1$, the maximum value, $B(=\max\{D_i\})$, of the distances $D_i$, and the minimum value, $C(=\min\{D_i\})$, of the distances $D_i$.

$$(B-A)/A \leq \alpha \text{ (e.g., } \alpha \text{ is 0.5)} \tag{1}$$

$$(A-C)/A \leq \beta \text{ (e.g., } \beta \text{ is 0.5)} \tag{2}$$

Figure 4A:
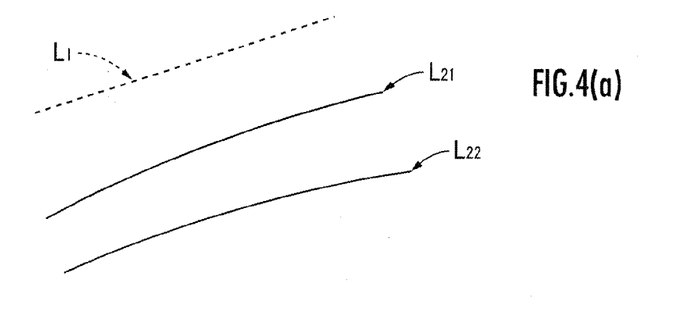

If there are plural second components that have the specified position relation with the first component, a second component closest to the first component or a second component having the highest degree of parallelization to the first component (i.e., the minimum variance of the distances $D_i$) is selected from among the second components, and set as the reference component. For example, the length of distance between the first component $L_1$ and the reference component $L_0$ shown in FIG. 3 is evaluated by distance $L_i$ between adjacent sampling points $p_i$ and $p_{i+1}$, and the magnitude of average values, $(=\Sigma D_i L_i/n)$, of products of the distances $D_i$ to the reference component (=second component $L_2$) at sampling points $p_i$. For example, as shown in FIG. 4(a), if second components $L_{21}$ and $L_{22}$ located below the first component $L_1$ (indicated by the broken line) both have the specified position relation with the first component $L_1$, the upper second component $L_{21}$ closest to the first component $L_1$ is specified as the reference component $L_0$.

Figure 4B:
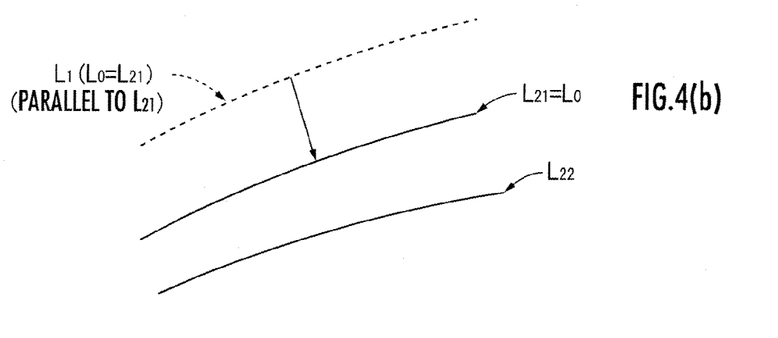

Then, the shape or the like of the first component is changed based on the shape or the like of the reference component (S006 in FIG. 2). Specifically, the first component $L_1$ is shaped in such a manner to equalize the distances $D_i$ to the reference component $L_0$ at the sampling points $p_i$ of the first component $L_1$ (see FIG. 3). Thus, as shown in FIG. 4(b), the first component $L_1$ is shaped to be parallel to the reference component $L_0=L_{21}$, and the shaped first component $L_1$ ($L_0=L_{21}$) is displayed on the panel 3. $L_1(L)$ denotes the first component $L_1$ whose shape or the like has been changed based on the shape or the like of the component L.

Figure 4C:
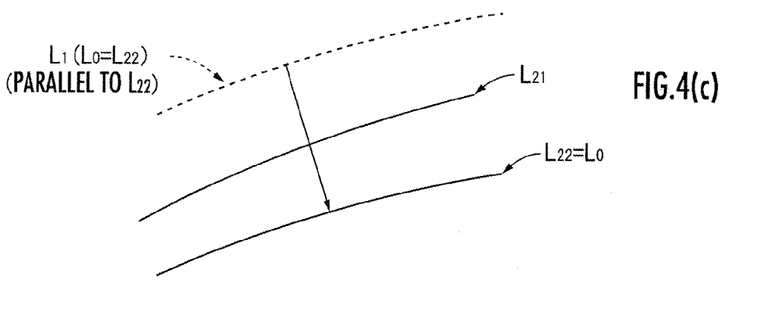
Figure 4D:
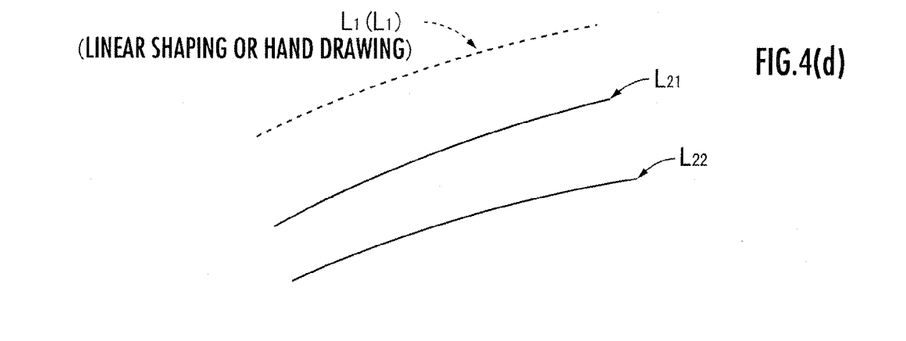

Then, the presence or absence of a specification operation is determined (S008 in FIG. 2). If the specification operation has been performed (YES in S008 of FIG. 2), a second component targeted for the specification operation is specified as a new reference component (S004 in FIG. 2). Then, the shape or the like of the first component is changed based on the shape or the like of this reference component (S006 in FIG. 2). For example, if the specification operation using the pen 2 (such as pressing of the operation button 22 of the pen 2 or creation of a certain position trajectory of the pen 2 on the panel 3) has been performed in the state shown in FIG. 4(b), the other second component L.sub.22 that has the specified position relation with the first component L.sub.1 as mentioned above is specified as the new reference component L.sub.0 instead of the second component L.sub.21 that had been specified as the reference component L.sub.0 until then. Then, as shown in FIG. 4(c), the first component L.sub.1 (L.sub.21) is shaped to be parallel to the new reference component L.sub.0=L.sub.22, and the shaped first component L.sub.1 (L.sub.0=L.sub.22) is displayed on the panel 3. If the specification operation has been performed in the state shown in FIG. 4(c), the first component L.sub.1 is shaped based on the shape of itself as shown in FIG. 4(d), and the shaped first component L.sub.1 (L.sub.1) is displayed on the panel 3. Then, if the specification operation has been performed in the state shown in FIG. 4(d), the second component L.sub.21 firstly specified is specified again as the reference component L.sub.0, and the first component L.sub.1 (L.sub.0=L.sub.21) shaped to be parallel to the reference component L.sub.0 as shown in FIG. 4(b) is displayed again on the panel 3. Note that if the specification operation has been performed in the state shown in FIG. 4(c), it may be configured such that the second component L.sub.21 firstly specified is immediately specified again as the reference component L.sub.0, and the first component L.sub.1 (L.sub.O=L.sub.21) shaped to be parallel to the reference component L.sub.0 as shown in FIG. 4(b) is displayed again on the panel 3. It may also be configured such that the up, down, right, and left movements of the tip of the pen 2 in a neighboring range of the first component L.sub.1 (L.sub.0) shaped by the output control device 4 is sensed to change the displayed position of the first component L.sub.1 on the panel 3 in up, down, right and left directions according to the sensed movements. Further, the distance between the first component and the reference component may be adjusted in response to detecting that the output control device 4 has performed a distance adjustment operation. As the "distance adjustment operations," operations of other operation switches (not shown) provided on the drawing support device 1 as well as touching or sliding of the pen 2 to a certain portion of the panel 3, and pressing of the operation switch 22 of the pen 2 can be employed. Further, the distance between the reference component and the first component parallel to this reference component may be adjusted to match a numeric value sensed by the output control device 4 according to the movement of the pen 2, or a numeric value entered on the output control device 4 though any of the other operation switches.

If it is determined that there is no specification operation in a certain period (NO in S008 of FIG. 2), the presence or absence of a freezing operation is then determined (S010 in FIG. 2). If it is determined that the freezing operation has not been performed (NO in S010 of FIG. 2), processing after the specification of the reference component is repeated without recognizing the first component as the second component (see S004 and the like in FIG. 2). If the freezing operation using the pen 2 (pressing of the operation button 22 of the pen 2 or creation of a certain position trajectory of the pen 2 on the panel 3) has been performed (YES in S010 of FIG. 2), the first component targeted for the freezing operation is recognized as a second component (S012 in FIG. 2). As a result, the shape or the like of the component that had been recognized as the first component until then is stored in the storage device of the output control device 4, and the stored shape or the like of the component enters such a state that it cannot be changed on its own which is referred to as a freezing operation.

Then, the presence or absence of an unfreezing operation is determined (S014 in FIG. 2). To initiate the unfreezing operation, pressing of the operation button 22 of the pen 2 or creation of a certain position trajectory of the pen 2 on the panel 3 can be employed. If it is determined that the unfreezing operation has been performed (YES in S014 of FIG. 2), the second component targeted for the unfreezing operation is recognized as the first component (S016 in FIG. 2). Then, the processing after the specification of the reference component is performed again on the new first component (see S004 and the like in FIG. 2). On the other hand, if it is determined that the unfreezing operation has not been performed (NO in S014 of FIG. 2), processing after recognition of a new position trajectory of the pen 2 is repeated (see S002 and the like in FIG. 2).

Figure 5A:
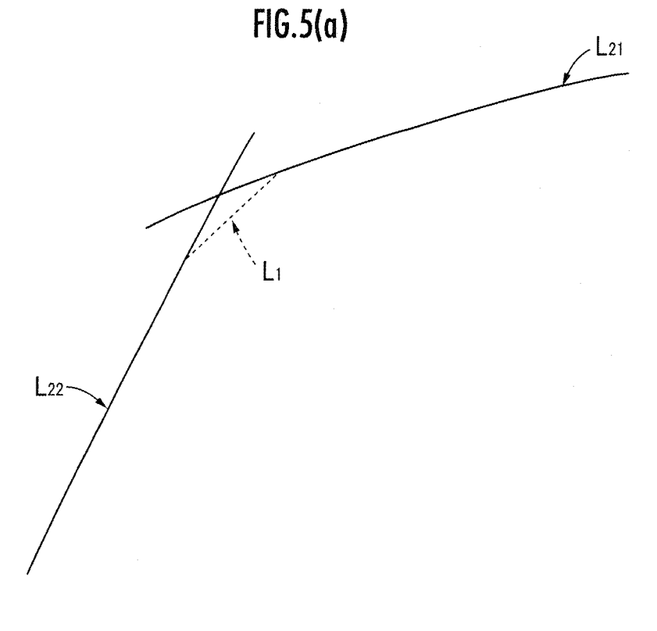
Figure 5B:
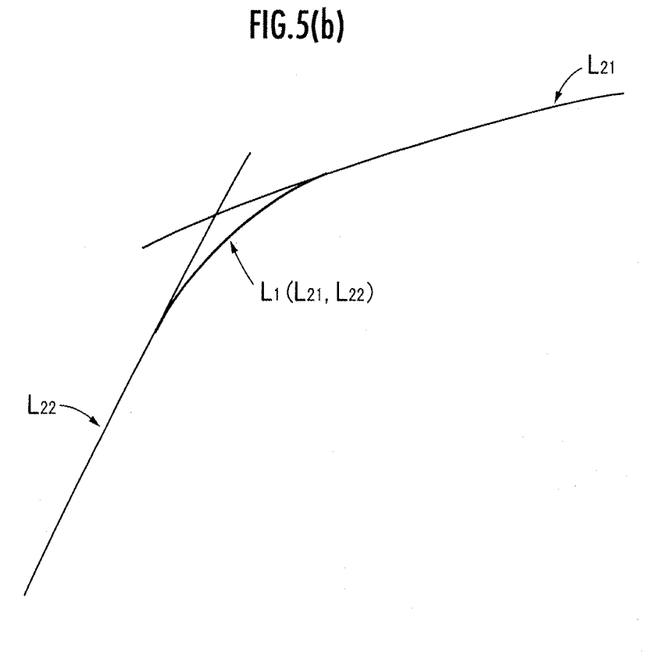

In the drawing mode, if a first component $L_1$ (indicated by the broken line), both ends of which are approximate with intersecting points of two second components $L_{21}$ and $L_{22}$ as shown in FIG. 5(*a*) and both ends of which are contained in the two second components $L_{21}$ and $L_{22}$, respectively, is recognized, the second components $L_{21}$ and $L_{22}$ are specified as reference components. As a result, the first component $L_1$ is shaped into one arc both ends of which contact with the second components $L_{21}$ and $L_{22}$ as shown in FIG. 5(*b*), and the shaped first component $L_1$ ($L_{21}$, $L_{22}$) is displayed on the panel 3.

Figure 6A:
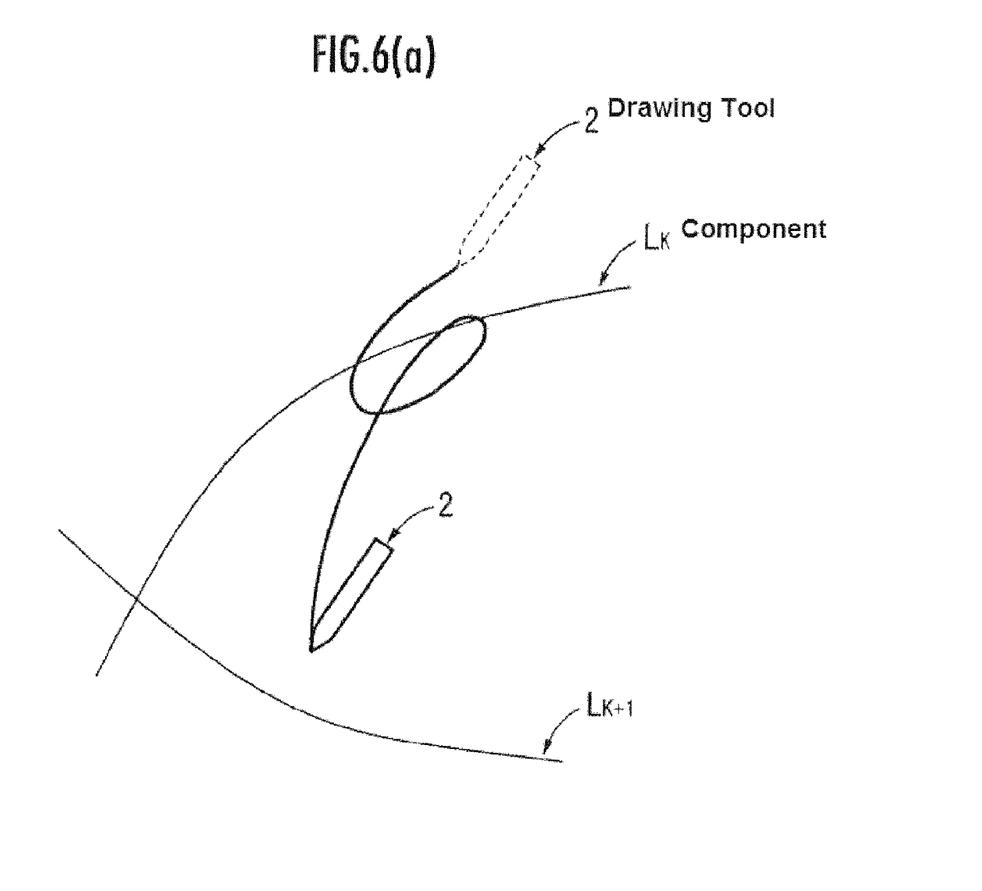
Figure 6B:
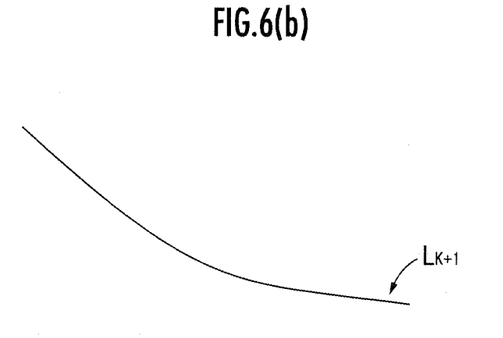

Next, the function of the drawing support device 1 in the "editing mode" will be described. In the editing mode, the output control device 4 erases a component (which may be limited to either the first component or the second component) from the panel 3 on condition that the component meets such requirements that the position trajectory of the tip of the pen 2 corresponds to an erasing gesture and the position trajectory overlaps the component displayed on the panel 3. For example, as shown in FIG. 6(*a*), if the tip of the pen 2 is brought into contact with the panel 3 that displays components $L_k$ and $L_{k+1}$ to draw a trajectory having one loop and making the position trajectory (or trajectory) of the tip of the pen 2 overlap the component $L_k$ to be erased, the component $L_k$ is erased from the panel 3 as shown in FIG. 6(*b*), and only the other component $L_{k+1}$ remains displayed on the panel 3. Instead of the position trajectory having one loop, a different shape of position trajectory, such as a triangular position trajectory, may be defined as the erasing gesture.

According to the drawing support device 1 that performs the above-mentioned functions, a component corresponding to a successive position trajectory of the tip of the pen 2 is displayed on the panel 3, and this enables drawing work with the feeling of hand drawing (see S002 in FIG. 2 and first component $L_1$ in FIG. 3). Further, among the components displayed on the panel 3, the shape or the like of the "first component" to be changed is changed based on the shape or the like of the "reference component" selected from second components excluded from the selection of the target, so that the workload of adjustment of the shape or the like of the first component can be reduced (see S006 in FIG. 2, and FIGS. 4(*b*) and 4(*c*)).

Further, although the second component targeted for the specification operation is specified as the reference component, since the pen 2 is used for the specification operation, continuity from the hand drawing of the component to the drawing work is not impaired (see S008 in FIG. 2). Further, since the reference component is limited to the second component targeted for the specification operation, a situation can be avoided in which a large number of first components, the shapes or the like of which have been changed in different aspects, are displayed which would make the freezing operation more complicated (see FIGS. 4(*b*) and 4(*c*)). Further, since the shape or the like of the first component is changed based on the shape or the like of the reference component at any timing in response to the specification operation, the workload of adjustment of the shape or the like of the first component can be reduced (see S006 in FIG. 2, and FIGS. 4(*b*) and 4(*c*)).

Further, although the first component targeted for the freezing operation is recognized as a second component, since the pen 2 is used for the freezing operation, the changed shape or the like of the first component can be stored without impairing continuity from the hand drawing of the component to the drawing work (see S012 in FIG. 2). Further, since the reference component is limited to a second component that has the specified position relation with the first component, a situation can be avoided in which a large number of first components, the shapes or the like of which have been changed in different aspects, are displayed on the panel 3 which would make the freezing operation more complicated (see S004 in FIG. 2).

Further, the second component targeted for the unfreezing operation is recognized as the first component, so that the shape or the like of any second component can be changed at any time in response to the unfreezing operation. This can reduce the workload of adjustment of the shape or the like of the second component recognized as the first component (see S016 and S006 in FIG. 2). Further, since the pen 2 is used for the unfreezing operation, the shape or the like of any second component displayed on the panel 3 can be changed without impairing continuity from the hand drawing of the component to the drawing work.

Thus, according to the drawing support device 1 that performs the above-mentioned functions, drawing work using the pen 2 can be supported while improving the continuity thereof.

Next, the function of the drawing support device 1 in the "memo mode" will be described. In the memo mode, the output control device 4 recognizes a memo (consisting of characters, numerals, marks, symbols, and the like) to cause the panel 3 to display this memo.

In the memo mode, a memo related to a component can be displayed on the panel 3. This makes it easy to find the way to arrange components by confirmation on the content of the memo, or to make a decision such as to determine the need to add or erase a component, so that the drawing work can be supported while improving the continuity thereof. Further, in the editing mode, since an existing component can be erased by an operation using the pen 2 with the feeling of hand drawing, the drawing work can be supported while improving the continuity thereof.

In the aforementioned embodiment, a reference component is selected according to the specification operation from second components having the specified position relation with the first component (see FIGS. 4(b) and 4(c)). However, as another embodiment, any second component may be specified according to the specification operation independently of the presence or absence of the specified position relation. As the "specification operation," moving of the pen 2 to draw a loop surrounding part of the second component as the specification target while the pen 2 is touching the panel 3, or pressing of the operation switch 22 while the tip of the pen 2 is touching the drawing medium near the second component as the specification target can be employed. The specification operation for any component as the target can be recognized by the output control device 4 at any timing after the first component is recognized. Therefore, any second component can be specified as the reference component at any time.

What is claimed is:

1. A drawing support device comprising a drawing tool, a drawing medium, and an output control device which causes the drawing medium to display components corresponding to position trajectories of the drawing tool, wherein the output control device
   (a) recognizes the components displayed on the drawing medium by classifying the components into a first component as a changing target, whose shape, posture, or arrangement, or a combination thereof (hereinafter referred to as "shape or the like") is to be changed, and a second component excluded from the selection of the changing target;
   (b) specifies the second component as a reference component on the condition that the second component has a specified position in relation to the first component, wherein the second component is used to change the shape or the like of the first component based on the shape or the like of the reference component; and
   (c) upon detecting no specification operation of the drawing tool within a defined period of time, recognizes, as the second component, the first component targeted for a freezing operation using the drawing tool, wherein the specification operation at least includes an operation of a switch provided on the drawing tool or a creation of a position trajectory of the drawing tool on the drawing medium, and the freezing operation temporarily prohibits editing on the recognized second component prior to an unfreezing operation,
   wherein the output control device repeats (a)-(c) on a new position trajectory of the drawing tool upon detecting no unfreezing operation of the recognized second component, and specifies the recognized second component as the first component upon detecting the unfreezing operation of the recognized second component.

2. The drawing support device according to claim 1, wherein the output control device specifies the second component as the reference component on the condition that the second component has been targeted for the specification operation in addition to or instead of the requirement that the second component has the specified position in relation to the first component.

3. The drawing support device according to claim 1, wherein the output control device recognizes, as the first component, the second component targeted for the unfreezing operation using the drawing tool.

4. The drawing support device according to claim 1, wherein the output control device recognizes a memo represented by position trajectories of the drawing tool, and causes the drawing medium to display the memo.

5. The drawing support device according to claim 1, wherein the output control device erases a component from the drawing medium upon detecting a position trajectory of the drawing tool corresponds to an erasing gesture and the position trajectory overlaps the component displayed on the drawing medium, 6. The drawing support device according to claim 1, wherein the output control device adjusts the distance between the first component and the reference component in response to detecting of a touching or sliding operation of the drawing tool to a predetermined position of the drawing medium, operation of the switch provided on the drawing tool, or operation of a switch provided on the drawing support device.

7. A drawing support program which is embodied in a non-transitory computer-readable medium and causes a computer to function as the drawing support device according to claim 1, the computer comprising a drawing tool, a drawing medium, and an output control device which causes the drawing medium to display components according to position trajectories of the drawing tool.

8. The drawing support device according to claim 1, wherein the output control device adjusts a distance between the first and second components based on a detected numeric value according to a movement of the drawing tool, or a received input through the output control device.

9. A method of supporting user's drawing operations by means of a drawing support device comprising a drawing tool, a drawing medium, and an output control device, comprising:
   (a) allowing a user to move the drawing tool;
   (b) allowing the output control device to recognize position trajectories of the drawing tool moved by the user to cause the drawing medium to display components corresponding to the position trajectories;
   (c) allowing the output control device to recognize the components displayed on the drawing medium by classifying the components into a first component as a changing target, whose shape, posture, or arrangement, or a combination thereof (hereinafter referred to as "shape or the like") is to be changed, and a second component excluded from the selection of the changing target;
   (d) allowing the output control device to specify the second component as a reference component on condition that the second component has a specified position relation with the first component;
   (e) allowing the output control device to change the shape or the like of the first component based on the shape or the like of the reference component;
   (f) upon detecting no specification operation of the drawing tool within a defined period of time, allowing the user to perform a freezing operation on the first component using the drawing tool, wherein the specification operation at least includes an operation of a switch provided on the drawing tool or a creation of a position trajectory of the drawing tool on the drawing medium;

(g) allowing the output control device to recognize, as the second component, the first component targeted for the user's freezing operation, wherein the freezing operation temporarily prohibits editing on the recognized second component prior to an unfreezing operation;

(h) repeating (a)-(g) on a new position trajectory of the drawing tool when the output control device detects no unfreezing operation of the recognized second component; and (i) specifying the recognized second component as the first component when the output control device detects the unfreezing operation of the recognized second component.

* * * * *